(12) United States Patent
van der Linde

(10) Patent No.: US 7,707,061 B2
(45) Date of Patent: Apr. 27, 2010

(54) METHOD FOR DATA PROCESSING AND DISPLAY FOR DETECTING AND/OR PREDICTING POSSIBLE TRENDS

(76) Inventor: Leon van der Linde, Virgen del Carmen 14, Buzon 779, Moraira (ES) 03724

( * ) Notice: Subject to any disclaimer, the term of this patent is extended or adjusted under 35 U.S.C. 154(b) by 969 days.

(21) Appl. No.: 11/412,069

(22) Filed: Apr. 27, 2006

(65) Prior Publication Data

US 2006/0293912 A1    Dec. 28, 2006

Related U.S. Application Data

(60) Provisional application No. 60/675,097, filed on Apr. 27, 2005.

(51) Int. Cl.
| | |
|---|---|
| G06F 17/30 | (2006.01) |
| G07G 1/00 | (2006.01) |
| G06F 9/44 | (2006.01) |
| G06F 17/50 | (2006.01) |
| G06F 19/00 | (2006.01) |
| G06F 11/30 | (2006.01) |
| G06F 11/00 | (2006.01) |
| G06F 3/00 | (2006.01) |

(52) U.S. Cl. .................. 705/10; 702/181; 702/183; 702/185; 702/186; 705/7; 714/25; 714/26; 719/318

(58) Field of Classification Search .................. None
See application file for complete search history.

(56) References Cited

U.S. PATENT DOCUMENTS

| | | | | |
|---|---|---|---|---|
| 5,528,516 | A  * | 6/1996 | Yemini et al. | 702/181 |
| 5,661,668 | A  * | 8/1997 | Yemini et al. | 702/186 |
| 6,249,755 | B1 * | 6/2001 | Yemini et al. | 702/183 |
| 6,697,791 | B2 * | 2/2004 | Hellerstein et al. | 706/47 |
| 6,868,367 | B2 * | 3/2005 | Yemini et al. | 702/183 |
| 7,546,609 | B2 * | 6/2009 | Florissi et al. | 719/318 |
| 7,600,007 | B1 * | 10/2009 | Lewis | 709/223 |

(Continued)

OTHER PUBLICATIONS

Heylighen F (1999). Collective Intelligence and its Implementation on the Web: Algorithms to Develop a Collective Mental Map. Computational and Mathematical Organization Theory. Oct. 1999. 5:3: 253-280.*

(Continued)

*Primary Examiner*—Scott L Jarrett
*Assistant Examiner*—Brett Feeney
(74) *Attorney, Agent, or Firm*—Christopher Wood; Wood & Eisenberg, PLLC

(57) ABSTRACT

A systematic method for detecting trends based on outcomes generated by a first process, comprising: (a) determining all possible outcomes associated with the first process, wherein the first process is associated with a range of possible outcomes; (b) coding the possible outcomes to provide a plurality of separate groups, wherein each possible outcome is systematically allocated to one of the groups; (c) allocating an identifier to each of the groups; (d) monitoring in real time the first process such that actual outcomes generated by the first process are mapped to an identifier in accordance with coding step (b); (e) providing a matrix comprised of a plurality of cells arranged in rows; (f) allocating each identifier generated in step (d) to said matrix in accordance with the exeleon allocation procedure; and (g) repeating step (f) until a trend of duplicating identifiers becomes self evident.

1 Claim, 6 Drawing Sheets

Exeleon Configuration  5,4,3,3,2,2,2,1,1

| | B1 | B2 | B3 | B4 | B5 | B6 | B7 | B8 | B9 |
|---|---|---|---|---|---|---|---|---|---|
| L1 | B | I | F | A | G | C | E | D | H |
| L2 | B | F | A | I | G | E | | | |
| L3 | F | I | A | G | e | b | | | |
| L4 | F | E | | | | | | | |
| L5 | F | | | | | | | | |

U.S. PATENT DOCUMENTS

| | | | |
|---|---|---|---|
| 2002/0165842 A1* | 11/2002 | Hellerstein et al. | 706/47 |
| 2003/0088458 A1* | 5/2003 | Afeyan et al. | 705/10 |
| 2004/0010733 A1* | 1/2004 | S. et al. | 714/27 |
| 2005/0137832 A1* | 6/2005 | Yemini et al. | 702/183 |
| 2005/0210133 A1* | 9/2005 | Florissi et al. | 709/224 |
| 2005/0261953 A1* | 11/2005 | Malek et al. | 705/10 |
| 2006/0149990 A1* | 7/2006 | S. et al. | 714/1 |

OTHER PUBLICATIONS

Kawanishi K (2004). A closed-form solution on a level-dependent Markovian arrival process with queuing application. CALCOLO 41: 153-175.*

* cited by examiner

| TABLE YY | |
|---|---|
| Roulette Wheel throw # | Output |
| 1 | 11 |
| 2 | 30 |
| 3 | 15 |
| 4 | 8 |
| 5 | 7 |
| 6 | 18 |
| 7 | 28 |
| 8 | 4 |
| 9 | 12 |
| 10 | 27 |
| 11 | 15 |
| 12 | 17 |
| 13 | 34 |
| 14 | 33 |
| 15 | 23 |
| 16 | 7 |
| 17 | 28 |
| 18 | 13 |
| 19 | 32 |
| 20 | 18 |
| 21 | 14 |
| 22 | 8 |
| 23 | 17 |
| 24 | 15 |

200a

| TABLE 1 | | | | | | | | |
|---|---|---|---|---|---|---|---|---|
| Application of the Exeleon Algorithm for allocating identifiers to a matrix based on outcomes from a spinning European roulette wheel | | | | | | | | |
| Roulette wheel throw # | Output | Identifier | Location In Matrix #1 | Duplication Of Identifier | Occurences of duplications | Identifier Shunted To Row # | Triggered or started a new row | Comment |
| 1 | 11 | B | B1,L1 | - | - | - | YES (row L1) | First output number |
| 2 | 30 | I | B2,L1 | - | - | - | - | - |
| 3 | 15 | F | B3,L1 | - | - | - | - | - |
| 4 | 8 | B | B1,L2 | YES (1$^{st}$ row) | FIRST | 2 (*i.e.*, L2) | YES (row L2) | - |
| 5 | 7 | A | B4,L1 | - | - | - | - | - |
| 6 | 18 | F | B2,L2 | YES (1$^{st}$ row) | FIRST | 2 (*i.e.*, L2) | - | - |
| 7 | 28 | G | B5,L1 | - | - | - | - | - |
| 8 | 4 | A | B3,L2 | YES (1$^{st}$ row) | FIRST | 2 (*i.e.*, L2) | - | - |
| 9 | 12 | C | B6,L1 | - | - | - | - | - |
| 10 | 27 | I | B4,L2 | YES (1$^{st}$ row) | FIRST | 2 (*i.e.*, L2) | - | - |
| 11 | 15 | F | B1,L3 | YES (2$^{nd}$ row) | SECOND | 3 (*i.e.*, L3) | YES (row L3) | - |
| 12 | 17 | E | B7,L1 | - | - | - | - | - |
| 13 | 34 | G | B5,L2 | YES (1$^{st}$ row) | FIRST | 2 (*i.e.*, L2) | - | - |
| 14 | 33 | I | B2,L3 | YES (2$^{nd}$ row) | SECOND | 3 (*i.e.*, L3) | - | - |
| 15 | 23 | E | B6,L2 | YES (1$^{st}$ row) | FIRST | | - | - |
| 16 | 7 | A | B3,L3 | YES (2$^{nd}$ row) | SECOND | 3 (*i.e.*, L3) | - | - |
| 17 | 28 | G | B4,L3 | YES (2$^{nd}$ row) | SECOND | 3 (*i.e.*, L3) | - | - |
| 18 | 13 | D | B8,L1 | - | - | - | - | - |
| 19 | 32 | H | B9,L1 | - | - | - | - | - |
| 20 | 18 | F | B1,L4 | YES (3$^{rd}$ row) | THIRD | 4 (*i.e.*, L4) | YES (row L4) | - |
| 21 | 14 | E | B5,L3 | YES (2$^{nd}$ row) | SECOND | 3 (*i.e.*, L3) | - | - |
| 22 | 8 | B | B6,L3 | YES (2$^{nd}$ row) | SECOND | 3 (*i.e.*, L3) | - | - |
| 23 | 17 | E | B2,L4 | YES (3$^{rd}$ row) | THIRD | 4 (*i.e.*, L4) | - | - |
| 24 | 15 | F | B1,L5 | YES (4$^{th}$ row) | FOURTH | 5 (*i.e.*, L5) | YES (row L5) | Last output number |

FIG. 3

| Exeleon Configuration 5,4,3,3,2,2,2,1,1 |||||||||
|---|---|---|---|---|---|---|---|---|
| B1 | B2 | B3 | B4 | B5 | B6 | B7 | B8 | B9 |

| | B1 | B2 | B3 | B4 | B5 | B6 | B7 | B8 | B9 |
|---|---|---|---|---|---|---|---|---|---|
| L1 | B | I | F | A | G | C | E | D | H |
| L2 | B | F | A | I | G | E | | | |
| L3 | F | I | A | G | e | b | | | |
| L4 | F | E | | | | | | | |
| L5 | F | | | | | | | | |

FIG. 4

Vertical Coding

| 1  | 2  | 3  |
|----|----|----|
| 4  | 5  | 6  |
| 7  | 8  | 9  |
| 10 | 11 | 12 |
| 13 | 14 | 15 |
| 16 | 17 | 18 |
| 19 | 20 | 21 |
| 22 | 23 | 24 |
| 25 | 26 | 27 |
| 28 | 29 | 30 |
| 31 | 32 | 33 |
| 34 | 35 | 36 |

| A | B | C |
|---|---|---|
| D | E | F |
| G | H | I |

FIG. 5

Horizontal Coding

| 1  | 13 | 25 |
|----|----|----|
| 2  | 14 | 26 |
| 3  | 15 | 27 |
| 4  | 16 | 28 |
| 5  | 17 | 29 |
| 6  | 18 | 30 |
| 7  | 19 | 31 |
| 8  | 20 | 32 |
| 9  | 21 | 33 |
| 10 | 22 | 34 |
| 11 | 23 | 35 |
| 12 | 24 | 36 |

| A | B | C |
|---|---|---|
| D | E | F |
| G | H | I |

FIG. 6

METHOD FOR DATA PROCESSING AND DISPLAY FOR DETECTING AND/OR PREDICTING POSSIBLE TRENDS

CROSS-REFERENCE TO RELATED APPLICATIONS

This application claims the benefit of priority from U.S. Provisional Patent Application Ser. No. 60/675,097, filed Apr. 27, 2005, the entire contents of which are incorporated herein by reference.

STATEMENT REGARDING FEDERALLY SPONSORED RESEARCH OR DEVELOPMENT

Not Applicable.

FIELD OF THE INVENTION

This invention relates to data processing and display for detecting and/or predicting possible trends.

BACKGROUND OF THE INVENTION

Human minds typically have difficulty in quickly processing and making sense of large quantities of numeric and nonnumeric data, particularly in real time. The task of detecting trends in real time to enable rapid rational decisions is often very difficult.

While there are numerous prior art software techniques for handling large volumes of data, such techniques often do not prove useful or meaningful in displaying information in an easy to understand manner to help discern trends to provide a basis for making rational decision to predict likely future outcomes.

Thus, a methodology solving the aforementioned problems is desired.

SUMMARY

The present invention, and the exeleon algorithm in particular can be used as a systematic method for detecting trends based on outcomes generated by a first process, comprising: (a) determining all possible outcomes associated with the first process, wherein the first process is associated with a range of possible outcomes; (b) coding the possible outcomes to provide a plurality of separate groups, wherein each possible outcome is systematically allocated to one of the groups; (c) allocating an identifier to each of the groups; (d) monitoring in real time the first process such that actual outcomes generated by the first process are mapped to an identifier in accordance with coding step (b); (e) providing a matrix comprised of a plurality of cells arranged in rows; (f) allocating each identifier generated in step (d) to said matrix in accordance with the exeleon allocation procedure; and (g) repeating step (f) until a trend of duplicating identifiers becomes self evident. In addition, one or more future outcomes are predicted based on one or more duplicated identifiers appearing in at least two rows.

BRIEF DESCRIPTION OF THE DRAWINGS

FIGS. 1 to 6 show various aspects of the application of the exeleon algorithm, according to the present invention.

DETAILED DESCRIPTION OF THE INVENTION

The invention is directed to a method for detecting and/or predicting possible trends in numeric or non-numeric data in real time or based on historic data.

Attached pages labeled P1 through P15 constitute part of the detailed description of the invention.

WORKING EXAMPLE#1

Attached page labeled "Page A" shows an exemplary non-limiting example of how the invention works (referred to as the Exeleon Algorithm) as applied to numeric output from a European roulette wheel. The European roulette consists of 37 identical slots, individually numbered from 0, 1 through 36. In European roulette, zero (i.e., 0) is regarded as a number of no real consequence. Ignoring 0, only 36 outcomes are possible: 1-36.

Figure 1:
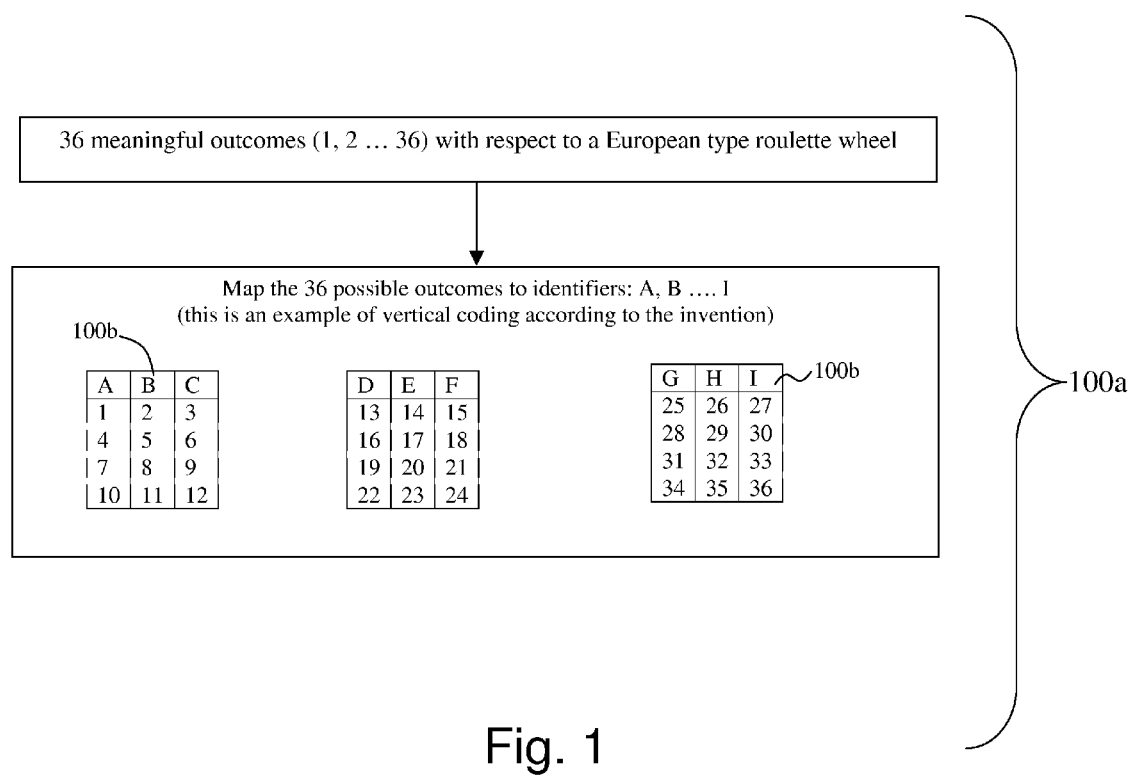

The set of possible outcomes, (i.e., 1 through to 36) are coded in any suitable way. For example, the 36 possible outcomes could be grouped in nine (9) groups as shown at 100*a* (and FIG. 1). Specifically, the 36 possible outcomes are displayed into three vertical columns further differentiated into 9 rows to provide 9 Groups, thus covering all 36 possible outcomes at 100*a*. Each group is given a letter identifier at 100*b*. For example, numbers 1, 4, 7, and 10 are grouped in Group A. The Groups thus range from A through I.

Figure 2:

A data set of 24 consecutive numbers produced by spinning the European roulette wheel is represented by the alphanumeric label 200*a* (and FIG. 2). The 24 consecutive numbers 200*a* are coded at 200*b* and are inserted sequentially into a novel 2D matrix at 200*c* in accordance with the exeleon algorithm (i.e., exeleon procedure; TABLE 1 (FIG. 3) shows an exemplary example of the exeleon algorithm, which here is used to process the output data shown, for example, in FIG. 2 and at 200*b*). The novel matrix 200*c* consists of 22 blocks or fields: a first row or level (labeled L1) of nine numeric fields, a second row (labeled L2) of 6 numeric fields, a third row (labeled L3) of 4 fields, a fourth row (labeled L4) of two fields, and a fifth row (labeled L5) consisting of just one field (B1,L5 or L5,B1). However, the data set 100*a* has 24 consecutive numbers and matrix 200*c* has 22 blocks or fields, the overflow is accommodated at the end of L3 as shown (see matrix 200*c* on attached page A).

Thus, the first nine numbers in the number series 200*a* are inserted horizontally into L1; for example, the first number in the data set 200*a* is "11" and this is coded as B and inserted into field B1,L1, or L1,B1; the second number in the data set 200*a* is "30" and this is coded as I into field B2,L1 or L1,B2; and so on until the matrix 200*c* is filled up (see Table 1 which shows an exemplary example of the exeleon algorithm of the invention which is used to generate matrix 200*c*).

As the European roulette wheel is spun, the table 200*c* fills up level by level. By level 4 (L4), a person might decide to bet on slots associated with letter codes F and E, i.e., slots 15, 18, 21, and 24; and 14, 17, 20, and 23, respectively. Thus, the output matrix 200*c* at L4 can be used to unemotionally place bets on numbers of groups F and E.

The inventor has made the very unexpected discovery that the exeleon algorithm generates a matrix in the form of an exeleon configuration of 5,4,3,3,2,2,2,1,1 with respect to the number of cells in each column that contain about 90% of the expected output as generated by the exeleon algorithm. An example of exeleon configuration is shown in FIG. 4, wherein column B1 has five cells, B2 has 4 cells, B3 has 3 cells, B4 has 3 cells, B5 has 3 (instead of the expected 2) and likewise for B6, and B7 has but one of the expected two cells filled, and B8 and B9 are filled in accordance with the exeleon configuration of 5,4,3,3,2,2,2,1,1.

It should be understood that the roulette wheel examples as used herein, are non-limiting exemplary examples that show how the invention can be used to process data and suggest in real time how a person using the invention might make rational and/or unemotional decisions on selecting likely future outcomes.

For example, the present invention can be applied to detecting trends in shoppers' buying habits. Products on sale in supermarket aisle can be vertically coded in the manner shown at 100*a* on attached page labeled A. Shoppers buying habits for the products so grouped can be monitored electronically at the store cash registers and predictions made as to which items are likely to require restocking first, second, third, etc.

The present invention, and the exeleon algorithm in particular can be used as a systematic method for detecting trends based on outcomes generated by a first process, comprising: (a) determining all possible outcomes associated with the first process, wherein the first process is associated with a range of possible outcomes; (b) coding the possible outcomes to provide a plurality of separate groups, wherein each possible outcome is systematically allocated to one of the groups; (c) allocating an identifier to each of the groups; (d) monitoring in real time the first process such that actual outcomes generated by the first process are mapped to an identifier in accordance with coding step (b); (e) providing a matrix comprised of a plurality of cells arranged in rows; (f) allocating each identifier generated in step (d) to said matrix in accordance with the exeleon allocation procedure; and (g) repeating step (f) until a trend of duplicating identifiers becomes self evident. In addition, one or more future outcomes are predicted based on one or more duplicated identifiers appearing in at least two rows.

In another non-limiting embodiment of the present invention, a systematic method is provided for detecting trends based on outcomes generated by a first process. The method includes the steps of: (a) determining all possible outcomes associated with the first process, wherein the first process is associated with a range of possible outcomes; (b) coding the possible outcomes to provide a plurality of separate groups, wherein each possible outcome is systematically allocated to one of the groups; (c) allocating an identifier to each of the groups; (d) monitoring in real time the first process such that actual outcomes generated by the first process are mapped to an identifier in accordance with coding step (b); (e) providing a matrix comprised of a plurality of cells arranged in rows; (f) allocating each identifier generated in step (d) to a row in said matrix and to a subsequent row in said matrix upon each occurrence of a duplicated identifier; and (g) repeating step (f) until a trend of duplicating identifiers becomes self evident. It should be noted some steps could be done in any order. For example, step (e) can be done as a first step.

In another example of the present invention, a systematic method is provided for predicting outcomes generated by a first process. This method includes the steps of: (a) determining all possible outcomes associated with the first process, wherein the first process is associated with a range of possible outcomes; (b) coding the possible outcomes to provide a plurality of separate groups, wherein each possible outcome is systematically allocated to one of the groups; (c) allocating an identifier to each of the groups; (d) monitoring in real time the first process such that actual outcomes generated by the first process are mapped to an identifier in accordance with coding step (b); (e) providing a matrix comprised of a plurality of cells arranged in rows; (f) allocating each identifier generated in step (d) to a row in said matrix and to a subsequent row in said matrix upon each occurrence of a duplicated identifier; and (g) predicting a future outcome based on one or more duplicated identifiers appearing in at least two preceding rows. It should be noted some steps could be done in any order. For example, step (e) can be done as a first step.

The present invention can be applied to a plethora of applications. For example, the exeleon algorithm, according to the present invention, can be applied to detect trends in failures in complex mechanical and/or electrical systems such as F18A Hornet aircraft. If there are hidden trends, the exeleon procedure can be applied to help detect failure trends and thereby predict likely future failures in specific components of the aircraft. Likewise, the present invention (and hence the exeleon algorithm) can be applied to detect trends and likely failures in any kind of complex aircraft such as the F15 Eagle, the F16 Falcon, and the Harrier jump jet, F14 Tomcat. Similarly, the present invention can be applied to detect failure trends in civilian aircraft such as Airbus (e.g., Airbus A320 family) and Boeing airliners such as the 747, 767, 777, and the upcoming Dreamliner Boeing, yet to go into production. v,1-15/2

I claim:

1. A systematic method for detecting trends based on outcomes generated by a first process, comprising the steps of:
   (a) determining all possible outcomes associated with the first process, wherein the first process is associated with a range of possible outcomes;
   (b) coding the possible outcomes to provide a plurality of separate groups, wherein each possible outcome is systematically allocated to one of the groups;
   (c) allocating an identifier to each of the groups;
   (d) monitoring in real time the first process such that actual outcomes generated by the first process are mapped to an identifier in accordance with coding step (b);
   (e) providing a matrix comprised of a plurality of cells arranged in rows;
   (f) allocating each identifier generated in step (d) to said matrix;
   (g) repeating step (f) until a trend of duplicating identifiers appear in at least two preceding rows;
   (f) wherein one or more future outcomes are predicted based on one or more duplicated identifiers appearing in at least two rows;
      wherein steps (a) through (g) are encoded into a computer software programmable language and run on a computer;
      wherein the matrix is a column by row Exeleon configuration of 5,4,3,3,2,2,2,1,1 in step (e);
      wherein the step of allocating each identifier to the matrix comprises:
         allocating each identifier to the first row from left to right;
         upon first duplication of identifier, allocating the identifier to the 2nd row from left to right;
         upon second duplication of the identifier, allocating the identifier to the 3rd row from left to right;
         upon third duplication of identifier allocating, the identifier to the 4th row from left to right; and
         upon fourth duplication of identifier, allocating the identifier to the 5th row thereby defining said matrix with a column by row Exeleon configuration of 5,4,3,3,2,2,2,1,1.

* * * * *